Patented July 10, 1928.

1,676,838

UNITED STATES PATENT OFFICE.

LORIN B. SEBRELL, OF AKRON, OHIO, ASSIGNOR TO THE GOODYEAR TIRE & RUBBER COMPANY, OF AKRON, OHIO, A CORPORATION OF OHIO.

ACCELERATOR, METHOD OF VULCANIZING CAOUTCHOUC, AND PRODUCT THEREOF.

No Drawing.    Application filed September 17, 1925.   Serial No. 57,022.

My invention relates to vulcanization of caoutchouc, and it is particularly related to an improved method of accelerating this process.

One object of my invention is to provide an accelerating body which, when incorporated in a caoutchouc mix, will give a desirable vulcanized product having high tensile strength and improved aging properties.

Another object of my invention is to provide accelerating material which may be readily manipulated under factory conditions.

For some time it has been known that the reaction products of aldehydes and amines have desirable accelerating properties. Thus, as early as 1913 Bastide described the utilization of a condensation product of formaldehyde and an aromatic amine. Subsequently, other materials which come within the broad classification of aldehyde amine reaction products have been disclosed by Peachey, British Patent No. 7,370 of 1914, Cadwell, U. S. Patent No. 1,417,970, and Ricard, U. S. Patent No. 1,440,176. The reaction products so produced have a consistency which varies from a liquid to a semi-solid. The degree of viscosity is controlled in part by the reactive ingredients and in part by the completeness of dehydration.

Recently North, U. S. Patent No. 1,467,984, has pointed out that by treating a dehydrated aniline acetaldehyde condensation product with an additional quantity of an aldehyde, the accelerating properties are essentially the same, yet the physical characteristics of the resulting product are changed from a viscous liquid to a hard, brittle resin which is more satisfactory from the standpoint of factory manipulation. Without the secondary treatment as provided by North, the condensation product referred to above is characterized by its liquid-like consistency.

I have found that a desirable accelerating material may be prepared by utilizing unsaturated aldehydes, of the aliphatic series. For example, by treating croton-aldehyde with aniline in equal mol proportions and subsequently heating the mass in order to dehydrate the product, a material is formed which has all the desirable properties of an accelerator and at the same time is a solid at room temperature. A typical preparation of an accelerating material embodying the principles of this invention follows. Equal mol proportions of aniline and croton-aldehyde are stirred together slowly. The mixture is subsequently heated and maintained at 150° C. from three to five hours, in order to complete the reaction and dehydrate the product. Subsequently it is subjected to a steam distillation to remove any unreacted materials as well as any undesirable volatile by-products. After the resultant material has been dried, it is of a brittle amorphous character which lacks the semi-fluid property of the saturated aldehyde amine reaction product prepared in a like manner.

The method of preparation, above described, may be varied if it is so desired. For example, by substituting a saturated aldehyde such as acetaldehyde for a portion of the croton aldehyde and heating the mixture in substantially the manner provided hereinabove, a product is formed which is not unlike that resulting from a pure croton aldehyde amine product. I have found, however, that it does not have the characteristic brittle property of the preferred embodiment but rather tends toward a soft and plastic consistency. In either case, however, the curing power is substantially the same.

Obviously the aforementioned preparations may be effected at higher or lower temperatures than those specified and for different lengths of time. Moreover, other unsaturated aldehydes may be utilized and other amines as, for example α naphthylamine, the several toluidines as well as the xylidines, may be substituted. Nor is the invention limited to cyclic amines, inasmuch as ethylamine, propylamine and other aliphatic amines forming part of a saturated or unsaturated structure may be employed. It should be noted, however that the extent of dehydration is of considerable importance, inasmuch as the physical characteristics of the ultimate product depend in part upon the completeness of this operation. I have experienced no difficulty in obtaining a product which is devoid of its plastic properties at room temperatures by subjecting the composition to an elevated temperature for a length of time, which varies somewhat, according to the amine employed, and also the proportion of unsaturated aldehyde making up the mix.

When the accelerator so prepared is incorporated in a rubber mix having the following ratio of ingredients:

| | Parts. |
|---|---|
| Rubber | 100 |
| Zinc | 5 |
| Sulphur | 3 |
| Accelerator | .5 | an average cure is obtained at a temperature which corresponds to that of steam at forty pounds pressure in thirty minutes. The vulcanized product so formed has an elongation of 770 percent at its breaking load of 150 kgs. per cm$^2$.

From the description hereinabove given, it will be apparent that by practicing my invention it is possible to produce an accelerating body having a distinctly solid characteristic without treatment with an additional quantity of an aldehyde. The accelerating body so produced imparts desirable physical as well as aging properties to the vulcanizate. Moreover, according to the method of preparation outlined, the yields which may be obtained are high.

While I have described, specifically, but a single embodiment of the present invention, together with minor modifications, it will be apparent to those skilled in the art that my invention may be subjected to many wide variations without departing from the scope thereof, and I desire, therefore, that it shall be limited only to accord with the prior art and the appended claims.

What I claim is:

1. A vulcanization accelerator comprising the reaction product of a mixture of an unsaturated aliphatic aldehyde, a saturated aliphatic aldehyde and an amine.

2. A vulcanization accelerator comprising the reaction product of a mixture of croton aldehyde, a saturated aldehyde and an amine.

3. A vulcanization accelerator comprising the reaction product of a mixture of croton aldehyde, a saturated aldehyde and an aromatic amine.

4. A method of vulcanizing rubber which comprises heating a vulcanizable rubber compound in the presence of the reaction product of a mixture of an unsaturated aldehyde, a saturated aldehyde and an amine.

5. A method of vulcanizing rubber which comprises heating a vulcanizable rubber compound in the presence of the reaction product of a mixture of croton aldehyde, a saturated aldehyde and an amine.

6. A method of vulcanizing rubber which comprises heating a vulcanizable rubber compound in the presence of the reaction product of a mixture of croton aldehyde, acetaldehyde and an aromatic amine.

7. A rubber product that has been vulcanized in the presence of the reaction product of a mixture of an unsaturated aldehyde, a saturated aldehyde and an amine.

8. A rubber product that has been vulcanized in the presence of the reaction product of a mixture of croton aldehyde, a saturated aldehyde and an amine.

9. A rubber product that has been vulcanized in the presence of the reaction product of a mixture of croton aldehyde, acetaldehyde and an aromatic amine.

In witness whereof, I have hereunto signed my name.

LORIN B. SEBRELL.